United States Patent [19]

Becerra-Novoa et al.

[11] Patent Number: 5,445,363
[45] Date of Patent: Aug. 29, 1995

[54] APPARATUS FOR THE PNEUMATIC TRANSPORT OF LARGE IRON-BEARING PARTICLES

[75] Inventors: Jorge O. Becerra-Novoa; Ricardo Viramontes-Brown; Marco A. Flores-Verdugo; Jose J. Garza-Ondarza, all of Nuevo Leon, Mexico

[73] Assignee: Hylsa S.A. de C.V., San Nicolas de los Garza, Mexico

[21] Appl. No.: 71,756

[22] Filed: Jun. 9, 1993

Related U.S. Application Data

[63] Continuation-in-part of Ser. No. 526,189, May 18, 1990, Pat. No. 5,296,015.

[30] Foreign Application Priority Data

Jan. 9, 1990 [MX] Mexico .................................... 19059

[51] Int. Cl.$^6$ .............................. F27B 3/18; F27B 3/19
[52] U.S. Cl. .................................... 266/182; 266/195; 266/198
[58] Field of Search .......................... 266/198, 195, 182

[56] References Cited

U.S. PATENT DOCUMENTS

| | | | |
|---|---|---|---|
| 2,103,088 | 12/1937 | Mullen | 266/182 |
| 2,892,698 | 6/1959 | Patterson | 266/182 |
| 4,437,796 | 3/1984 | Ulveling et al. | |
| 5,296,015 | 3/1994 | Becerra-Novoa et al. | 75/10.66 |

FOREIGN PATENT DOCUMENTS

| | | | |
|---|---|---|---|
| 0021222 | 1/1981 | European Pat. Off. | 266/176 |
| 3201608 | 9/1982 | Germany | 266/182 |

*Primary Examiner*—Melvyn Andrews
*Attorney, Agent, or Firm*—A. Thomas S. Safford

[57] ABSTRACT

In method and apparatus for producing iron and steel from iron cores largely composed of iron oxides, wherein a direct reduction process is used to produce a solid particulate intermediate product, generally known as sponge Iron or Direct Reduced Iron (DRI); pneumatically conveying large iron-bearing particles, such as pelletized iron ore or particularly DRI, in a closed transport pipe, eg. from the reduction reactor of the direct reduction process to the metallurgical furnaces where liquid iron or steel are produced, for example electric arc furnaces, induction furnaces, basic oxygen furnaces, etc. or to a briquetting press to form DRI briquettes, or simply to a silo or storage bin, or in general to a subsequent processing step for said DRI. When the carrier gas is recirculated for reuse, surprisingly air can be a preferred source of such gas, especially for reactive hot DRI. This method has a superior efficiency and productivity and reduces the overall energy consumption relative to currently used DRI steelmaking plants.

By using pneumatic conveyors, elements of the plant may be arranged side by side rather than one on top of the other, whereby the overall height of the plant may be reduced.

9 Claims, 7 Drawing Sheets

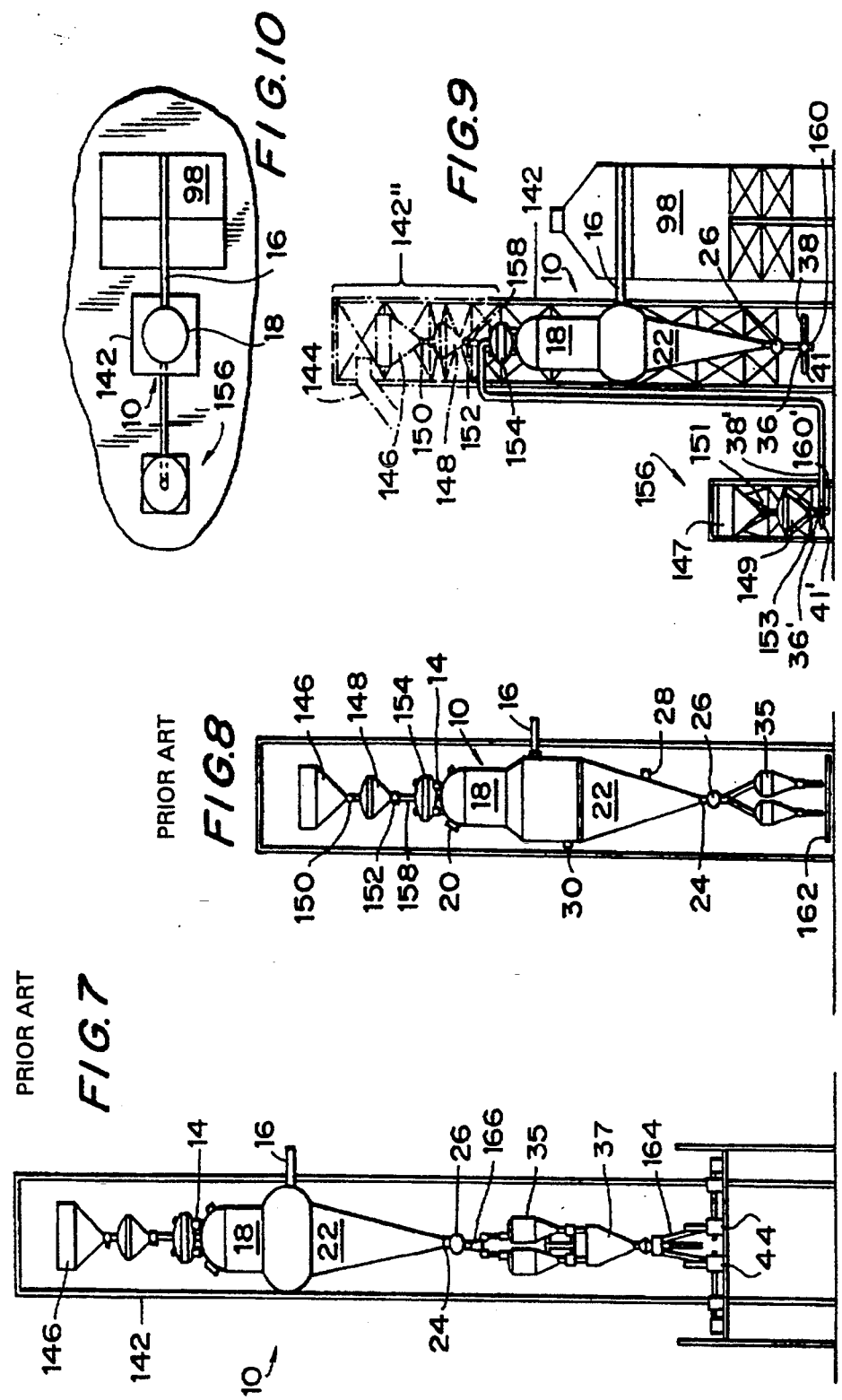

APPARATUS FOR THE PNEUMATIC TRANSPORT OF LARGE IRON-BEARING PARTICLES

RELATED APPLICATION

This is a continuation-in-part application of prior allowed U.S. patent application Ser. No. 07-526,189, filed May 18, 1990 now U.S. Pat. No. 5,296,015.

FIELD OF THE INVENTION

The present invention relates to method and apparatus applicable in the production of iron and steel, wherein direct reduction process and apparatus are employed to produce an intermediate product in the form of a particulate solid, commonly known as sponge iron or Direct Reduced Iron (DRI). More particularly, the invention is characterized by iron-bearing particles, including iron ore, preferably pelletized, or even more significantly the produced DRI (at least 90% of which is preferably larger than 5 mm) being pneumatically transported from the reduction reactor of said direct reduction process to a remote location for subsequent storage or processing, e.g. preferably to melting metallurgical furnaces to produce liquid iron and steel. The prior disclosed invention is further characterized by apparatus for such pneumatic transport having several unexpected and superior advantages.

BACKGROUND OF THE INVENTION

In the recent years, the necessity of rendering the steelmaking processes more efficient, more productive, and less wasteful, has become increasingly urgent, due to rising production costs (particularly energy costs) and also due to the increasing restrictions imposed upon steel plants for ecological reasons.

One of the successful routes for producing steel, which is being increasingly promoted and has become more widely utilized, is the direct reduction without melting of lumps or pellets of ore with subsequent electric arc furnace refining. This is in contrast to the traditional steel plants using blast furnaces and basic oxygen converter furnaces for making steel from melted ore. Although in the present specification a preferred embodiment of the invention is described as applied to a steelmaking plant comprising a direct reduction plant and electric arc furnaces, it is evident that the invention in its broader aspects can be adapted to other applications where DRI or other metallic iron bearing particles (hot or cold) such as pelletized or lump ore are to be transported.

In order to better understand the invention, some of the characteristics of DRI are given herein, which will help one to appreciate why pneumatic transport systems had never been previously recommended for handling of iron ore and/or DRI during the commercial production of DRI nor ever successfully so used before with large particles of such material (i.e. involving sizes mostly on the order of 0.5 mm or larger).

DRI is commercially produced by direct reduction of lumps or pellets of iron ore by contacting these with a stream of reducing gas at a high temperature. Reduction is carried out in the solid state. The resulting DRI is a friable particulate solid which is very porous and reactive at high temperatures. At such elevated temperatures, it reoxidizes exothermically with water or oxygen in the ambient air.

Iron ores employed for direct reduction are generally iron oxides: hematite and magnetite. When the iron ore has a high iron content, for example above 55%, it can be economically processed by simply breaking it down to particle sizes at least 80% and preferably at least 90% of which are greater than 0.5 cm and range up to about 6 cm (i.e. 0.2 to 2.4 inches). It is also necessary that said ore has a high mechanical strength so as to withstand pressures, shocks and crushing which tend to create undesirable and excessive fines during its transport and handling. Such dust-like fines can cause considerable problems, such as uneven flow and gas channelling inside the fixed or moving bed reduction reactor. This results in unhomogeneous reduction, thus producing DRI of an inferior and uneven quality.

In order to render it mechanically stronger, it is preferred in many cases, to grind the iron ore, magnetically concentrate it to increase its iron content, include some additives such as lime and dolomite, and form it into pellets in the 0.5 to 2.4 cm range. In this pelletizing process, the pellets formed are generally spherical with the desired chemical composition needed for optimal performance in the reduction process and also in the subsequent steelmaking stage in the electric arc furnace. Since pellets have a higher iron content with a more uniform quality, they can consequently be transported over long distances by truck, rail, etc., more economically (because the unnecessary transportation of a substantial amount of gangue is avoided).

Direct reduction plants chemically reduce iron ores by contacting the particles, which may be irregularly shaped pieces of iron ore or pellets or mixtures thereof, with a stream of reducing gas, largely composed of hydrogen and carbon monoxide, at a temperature between 850° and 1,050° C., normally at about 950° C.

The commercial reduction reactor may be of the fixed bed or moving bed type. It is evident that in order to increase the reaction rate between the solid ore particles and the reducing gas, it is desirable that said particles be highly porous. However, this characteristic also makes DRI very reactive, since it contains a high proportion of metallic iron, which tends to reoxidize when in contact with the oxygen in air or water. As is typical of all chemical reactions, reoxidation of DRI is faster and more violent as the temperature increases. This is why DRI in the past always has most desirably been safely handled at ambient temperature and is normally cooled down inside the reduction reactor by circulating a cooling gas therethrough before it is discharged. See, for example, U.S. Pat. Nos. 3,765,872; 4,046,557; and 4,150,972.

Cooling DRI, although commonly considered necessary for the safe handling of the DRI to avoid reoxidation problems and to reduce the need for expensive temperature resistant pumps, valves, etc., has however long been recognized as disadvantageous with respect to the energy efficiency of the overall steelmaking process. Since much of the thermal energy of the DRI is lost through its cooling; therefore, it is necessary to spend more energy to heat the DRI once again in order to melt it and convert it to steel. Only some of the lost energy is usefully recovered in steam generation, in heat exchangers, and the like.

To meet this problem, it has been proposed in the past to omit cooling the DRI in the reduction reactor and to discharge it at the highest feasible temperature, normally in the range of 400° to 750° C. in order to decrease energy cost in the electric furnaces where DRI is melted, or alternatively to hot briquet the DRI, commonly at temperatures above 600° C. This represents substantial energy savings. However, transportation of DRI at high temperature has so far involved using systems which have significant drawbacks.

U.S. Pat. Nos. 3,799,367 and 4,188,022 teach discharging DRI at a high temperature from a direct reduction reactor without cooling it down to ambient temperature. It is proposed to transport this hot DRI to its next processing step, utilizing containers which are placed at the outlets of the discharge bins of the reduction reactor. These containers are filled with an inert gas to prevent contact of hot DRI with oxygen in the air, thus avoiding reoxidation thereof. This transport system, however, presents a number of disadvantages, because the containers with DRI must be moved through the plant by means of trucks or railroad equipment. This requires a maintenance system for motorized vehicles with its consequent high operating costs.

Furthermore, such a system also needs transit space within the plants. In an already existing plant, it is very difficult to open suitable space for transit of trucks or a railroad, if such installations are not planned beforehand.

As previously discussed, it has been also proposed in the past to form the DRI particles into briquettes while at high temperature whereby compaction of DRI particles into dense briquettes decreases substantially the porosity and thereby its reactivity. However, even if only for hot DRI transport to the briquetting press, systems currently in use are complicated and involve large investment and high operating costs.

German patent No. 3806861 teaches transport of hot DRI in a bin. Such bins are used with pressure locks in some direct reduction processes operating at pressures over one atmosphere. These processes require pressure locks for charge and discharge of the reduction reactor. This transport system is however applicable only to short distances, for example from the reduction reactor to a briquetting press located close to said reactor. If DRI is to be transported over longer distances, for example hundreds of meters, this system using pressure lock bins is not practical nor economical since it would require a larger number of such bins, which, due to their required characteristics for pressure, temperature and abrasion resistance as well as their sealing valves, are expensive.

By far the most common current practice for DRI transportation involves discharge from the reactor at low temperatures, for example at temperatures below 100° C., and utilization of open belt conveyors. See for example U.S. Pat. No. 4,254,876. DRI is moved by means of these belt conveyors, to silos or storage bins and then to feeding bins of the electric furnaces at the meltshop. This method, however, has several drawbacks. For example, the fines, e.g. the very small particles produced from the abrasion and breakage of ore lumps, of pellets, or of DRI inside the reduction reactor and during of subsequent handling of DRI on the conveyors etc., are spilled at transfer points and are entrained by ambient air currents passing over the open conveyors with the consequent problems of losses of valuable metallic iron units and of significant environmental pollution. These losses of metallic iron, which mainly occur at the transfer stations of the DRI, can be as high as 2% to 10% of DRI production, depending on the type of facilities.

Non-commercialized attempts to produce DRI by fluidized bed direct reduction methods have been proposed from time-to-time. These teach the use of very fine-grained ores up to only 3 mm in diameter (and preferably less than 0.5 mm). In dealing with a grain size appropriate to being fluidized, a few such references have suggested pneumatic transport of such "fine-grained sponge iron" (see U.S. Pat. Nos. 4,007,034 and 4,045,214). See also German Patent Publication No. 32 01 608 A1 filed Jan. 20, 1982 (based upon Italian priority application of Jan. 1, 1981). This German patent shows a pneumatic feed of sponge iron to an electric furnace but fails to disclose any capability of the feed to handle large pellets of sponge iron or iron ore, being entirely silent on particle size and merely referring to dosing of "granular or powdered charge materials, especially sponge iron"; which terminology has been consistently recognized in the prior art as being significantly smaller than the upper limits of three millimeters known in the prior art. See, in particular U.S. Pat. No. 4,008,074 which epitomizes the state of the prior art relative to pneumatic transport of sponge iron. This patent states "fine-grained sponge iron generally has a particle size ranging from about less than 1$\mu$ to 3 mm and thus is much smaller than the pieces or pellets of sponge iron placed on the surface of the metal bath . . . all starting materials except for the pellets or pieces of sponge iron and scrap are fed in pneumatically" [column 4, lines 48–52 & column 6, lines 9–11, emphasis added]. This patent teaches use of pneumatic transport of sponge iron, but only of "fine-grained" particles and fails to appreciate or even suggest pneumatic transport of the heavier pellets and instead feed the pellets etc. by gravity only through "metering devices 24 and 25" in the melting vessel roof [see column 7, lines 57–58]. U.S. Pat. No. 4,412,858 is the only reference known to applicants which is relevant to the commercially-proven larger-sized DRI particles (i.e. greater than 0.5 cm) that has any suggestion of pneumatic transport of such DRI. Yet, even this latter patent's teaching is only in the context of the larger "sponge iron pellets [being]. . . converted to finely divided form" by "grinding or milling" prior to transport by a carrier gas.

A further aspect of pneumatic transport of large particles in direct reduction processes that may have contributed to the prior art's failure to recognize its feasibility could be the apparent large energy cost of such pneumatic transport (e.g. to run the large compressors to drive the carrier gas). Unappreciated in such an evaluation are the considerably more substantial offsetting savings in energy costs, in addition to the capital cost savings, when this process and associated apparatus is used particularly in charging hot DRI by pneumatic transport to an electric arc furnace or similar subsequent high temperature processing.

Crushed limestone is reported to have been pneumatically transported over short distances as a feed device; however, this is a relatively soft material as compared to DRI (or even to iron ore). Thus, in spite of such uses, such lime transport has never been extended to or suggested for iron ore or for DRI of a size greater than 3 mm.

There is also considerable literature on pneumatic transport of catalyst particles in the petroleum industry, but always of smaller particles of a size appropriate for use in a fluidized bed.

OBJECTS AND SUMMARY OF THE INVENTION

It is an object of the present invention to provide a method for the production of iron and steel employing a system for transportation of commercial-size particles of iron ore or of DRI at high and low temperatures, which is economically applicable to short and long distances, which increases the productivity of a steelmaking plant by avoiding losses of fines and of DRI reoxidation and preferably by eliminating cooling with hot transport to subsequent hot processing, and which also shortens subsequent steel processing time (thus increasing productivity) and minimizes the problem of environmental pollution caused by said fines, and additionally reduces capital costs by significantly reducing the height of the direct reducing plant structures (thus substantially reducing the need for costly and heavy duty support structure, particularly for the heavy refractory lined reactors and closely adjoining heaters).

Other objects and advantages of the invention will be evident to those skilled in the art or will be described in this specification of the invention and appended drawings.

According to the present invention, the objects thereof are achieved by means of method and apparatus for the production of iron and steel wherein DRI of a size largely over 0.5 cm is pneumatically transported. This preferably comprises producing said DRI in at least one direct reduction reactor and transporting such DRI pneumatically by means of a carrier gas caused to flow through a duct extending from a first point (at the discharge into said duct of said DRI from said reduction reactor) to a second point (of remote use or storage of the DRI). This method and similar apparatus is also advantageously used according to this invention to transport lump or pelletized iron ore from a storage area to the top of the direct reduction reactor (eliminating the need for a receiving bin and a pressurizing bin on top of the reactor) which structures can be positioned on the ground beside the reactor thus eliminating a significant amount of upper support structure and further reducing the mass of the remaining support structure resulting in significant savings in capital costs. Use of the pneumatic transport for moving the DRI from the reduction reactor to a second remote point similarly reduces the overall height of the structure by eliminating the need for a depressurization bin below the reactor, eliminating the need for an elongated cooling zone (if hot discharged), and eliminating the need for briquetting machinery under the reactor (which briquetting machinery instead can be supplied by pneumatic feed when placed beside, instead of under, the reactor).

The carrier gas stream may have a variety of chemical compositions. For example air, natural gas, synthesis gas or reducing gas of the same type used for DRI production may be utilized. Preferably, the gas stream is air which has been contained and recirculated.

In general, solids can be transported by the potential and/or kinetic energy of a gas. The driving gas transfers momentum to the solid by means of a pressure drop and by dynamic force (force exerted on the solid by the gas velocity and mass). When the solid is lifted in the gas stream by a dynamic force, the system is characterized by high velocities, and this is referred as dilute phase transport. When the solid is pushed at low velocity by the gas pressure differential, the system is characterized by the formation of solids plugs or dunes, and this is referred to as dense phase transport. Depending on the dynamic force, the solid can be transported in either dense or dilute phase, or both. Real systems often behave in a range comprising a combination of both regimens. Experience while developing this invention has shown that the carrier gas tends to function in a dense phrase plug (or dune-like) flow over shorter distances and in elevated runs and in a dilute phase over longer distances. Pneumatic transport of DRI (or of similar large iron ore particles) is preferably carried out at a carrier gas velocity in the range of 9 to 35 m/sec., at a pressure of between 1 and 5 $kg/cm^2$, at a ratio of mass of DRI to mass of carrier gas between 7 and 25. For relatively shorter distances, e.g. in feeding iron ore to the elevated top of the reducing reactors (typically at a height of about 60 meters) from a nearby ground level supply, a dense phase pneumatic trasnport is employed (which advantageously has a carrier gas velocity of 5 to 10 meters per second). For the longer distances, a dilute carrier gas velocity is used (in the range of 13 to 50 meters per second.

The problems and drawbacks of cold and hot transportation of commercial DRI in steelmaking plants, have not heretofore been satisfactorily solved. These problems have long existed and been recognized for many decades (at least since the first effective commercialization of the direct reduction process in the 1950s). The present invention effectively minimizes these problems to great advantage, by surprisingly teaching contrary to conventional wisdom the use of pneumatic transport of DRI of a size mainly in excess of 0.5 cm in steelmaking plants, while modifying the transport operating conditions to achieve offsetting advantages of minimized reoxidation, minimized heat loss, containment against air and ground pollution, and less handling and storage requirements (thus resulting in less overall maintenance and space requirements for handling), often with a significant increase in the rate of production and at a substantial cost saving, all unexpectedly without excessive abrasion of the transport equipment and fractionation of the DRI.

Normally pneumatic transport has been applied to convey very small particles, e.g. powders. In the very rare applications of pneumatic transport of high density particles having a size larger than 1 cm, such installations have not operated at a continuous rate due to the rapid and substantial deterioration of the ducts caused by the impacts of said particles. The present invention minimizes this problem by the particular velocity range at which it operates and renders possible its industrial application.

One of the problems presented by the application of pneumatic transport of DRI, is fines formation which is caused by the strong collision of particles against the pipe wall, principally at direction changes. This is surprisingly minimized by the counter-intuitive use of right angle T-junctions that collect stationary particles in the corners of the angle to result in a naturally smooth transition curve, to cushion the impact of the particles relative to the pipe walls to protect both the particles from breakage and the pipe at the angle from abrasion.

Fines from breakage lower the overall yield of the steelmaking process because their light weight causes them to be entrained in the gases that exit the electric furnaces. The present invention, however, minimizes this problem due to its particular operating conditions.

The known reactivity of DRI with air in the past ruled out the use of air as carrier gas. However, according to one of the particularly preferred embodiments of the present invention, the air is surprisingly effectively used by being contained and continuously recirculated within the transport duct such that under steady state operation the comparatively small amount of oxygen initially in the air circulating in the duct reacts with DRI and through its recirculation the gas remaining in the transport duct soon becomes largely composed of nitrogen, all unexpectedly without any significant effect on the quality of the net amount of transported DRI (in spite of the initial presence of oxygen). This represents a great economic advantage, because it is not necessary to produce or buy separately an inert gas nor use a costly and potentially hazardous reducing gas as a protective carrier gas for transport purposes.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

FIGS. 7 to 9 are diagrammatically drawn to the same scale for comparison purposes (with much of the support structure omitted, especially in FIGS. 7 & 8, for purposes of clarity), these illustrate the advantage of the invention shown in FIG. 9 relative to the conventional prior art structures shown in FIGS. 7 and 8;

FIG. 7 in particular is a diagrammatic illustration of a prior art direct reduction reactor with associated feed and discharge equipment for supplying hot DRI to a multiplicity of briquetting machines;

FIG. 8 is similar to FIG. 7 but instead shows a conventional cold discharge direct reduction reactor feeding to a conventional conveyor belt transport;

FIG. 9 is similar to FIGS. 7 and 8 but illustrates a hot discharge direct reduction reactor (with an associated heater) and having a pneumatic discharge transport as well as an pneumatic iron ore feed transport (showing the supplanted conventional skip hoist iron ore feed with its bins and related superstructure all in phantom outline); and FIG. 10 is a diagrammatic plan view of the structures in FIG. 9.

DETAILED DESCRIPTION OF THE INVENTION

Figure 1:
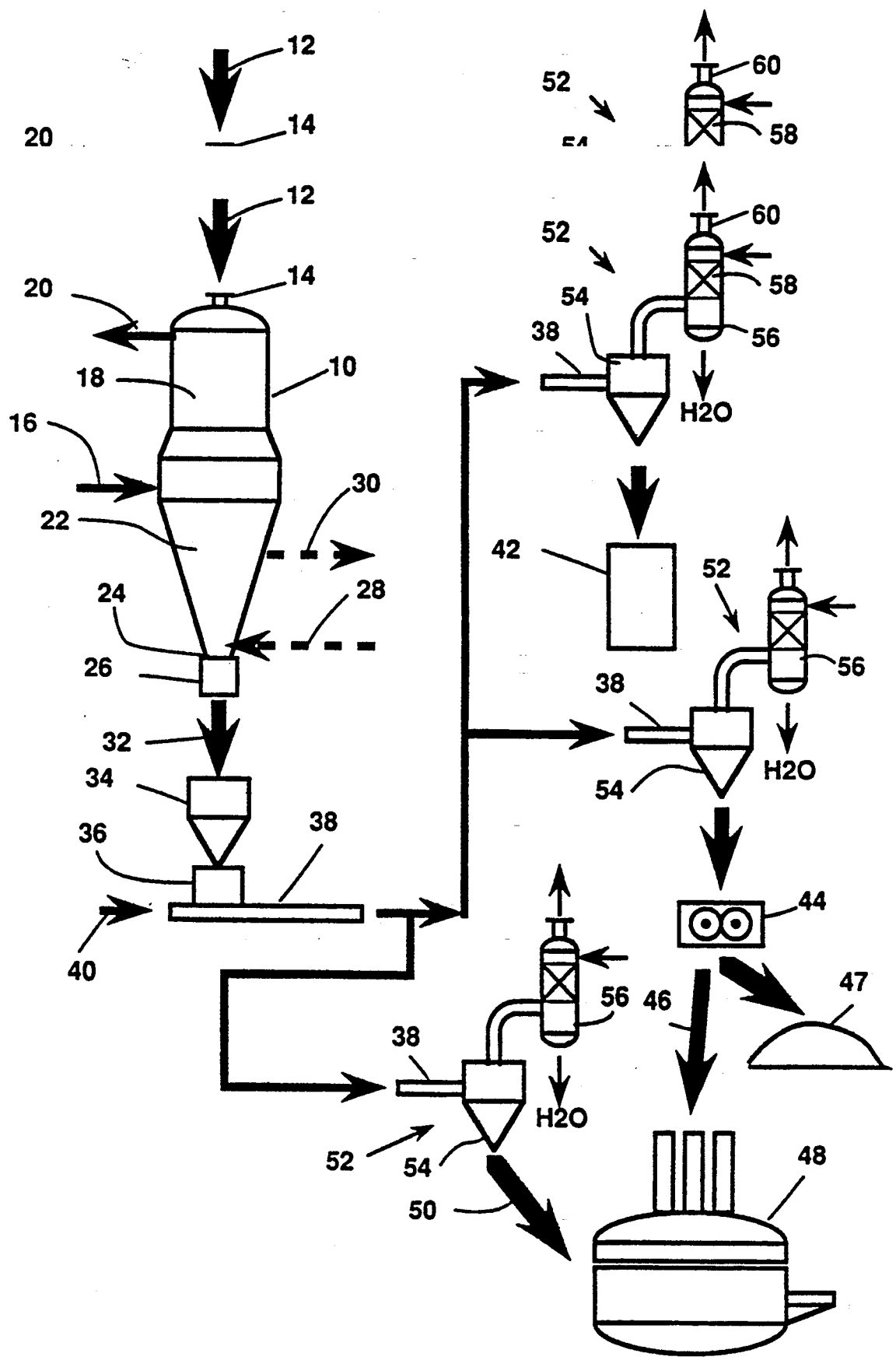
FIG. 1 shows schematically a steelmaking plant illustrating a preferred embodiment wherein DRI is pneumatically transported from the reduction reactor to one or more points of processing said DRI, which are alternatively and/or sequentially illustrated as being a briquetting press, an electric arc furnace in a meltshop, and a storage bin.

With reference to FIG. 1, numeral 10 generally designates a direct reduction reactor to which iron ore 12 is fed in form of lumps, pellets or mixtures thereof, through at least one inlet 14. The iron ore descends through the reactor 10 and is countercurrently contacted with a reducing gas at high temperature, normally in the range of 850° to 950° C., which reducing gas is introduced to the reactor at point 16 located in the lower part of the reduction zone 18, and is removed from the reactor at point 20 located in the upper part of said reduction zone, in a manner already known in the art.

At the lower part of reactor 10 there is a conical section 22 which converges to at least one outlet 24 through which the already reduced ore or DRI is discharged. In many plants this lower zone 22 is used as cooling zone for DRI, in order to cool it down to ambient temperature for handling without reoxidation problems when in contact with the atmosphere. In order to cool down DRI, normally a cooling gas stream is circulated countercurrently to the DRI, which gas is introduced at the lower part thereof, as indicated by numeral 28 and is removed hot at the upper part thereof as indicated by numeral 30. Both the reducing gas and the cooling gas are recycled to the reactor as it is well known in the art. When it is desired to discharge the DRI at high temperature, the cooling gas loop is not used and DRI is discharged hot.

DRI is discharged from the reduction reactor at a rate regulated by a device 26 which may be a rotary or star valve, for example as described in U.S. Pat. Nos. 4,427,135 and 4,427,136, or may be other devices of the type described in U.S. Pat. Nos. 3,375,099; 2,670,946; 4,129,289 and 4,032,120.

DRI 32 is passed to a discharge accumulation bin 34 wherefrom it is introduced at a regulated rate into duct 38 by means of a device 36, which may be a rotary valve (also called a star feeder), a screw type feeder, or a vibratory feeder.

A gas stream 40 is caused to circulate through duct 38 to entrain and pneumatically convey the DRI to a remote point illustrated for example as (1) a storage bin or silo 42, (2) a briquetting press 44 (where briquettes 46 of DRI are formed), and/or (3) an electric arc furnace 48. With the advantages already mentioned above, the briquettes 46 from the press 44 may be charged to a metallurgical furnace, here illustrated as an electric arc furnace 48, or to a different type of furnace where metallic iron is melted and refined, such as induction furnaces, basic oxygen furnaces (BOF), melter-gasifiers, etc., or just to a temporary storage pile 47.

In one of the preferred alternatives, the DRI may be transported and directly charged into the electric arc furnace as indicated by arrow 50.

Each one of the illustrated alternatives of FIG. 1 is provided with a receiving station 52 for DRI, comprising a receiving bin 54 which may be used to disengage the carrier gas and the solid particles by a simple expansion of the flow area. Disengagement of the particles from the carrier gas is aided by an enlargement of the pipe 38 close to its introduction into the bin 54 (thus reducing the flow velocity).

Carrier gas exits the receiving bin 54 and passes to a cleaning and cooling tower 56, where said gas is contacted with water in a packed bed 58, in a manner known in the art. The gas cleaned and at, or relatively near, ambient temperature exits the tower 56 through outlet 60.

Figure 2:
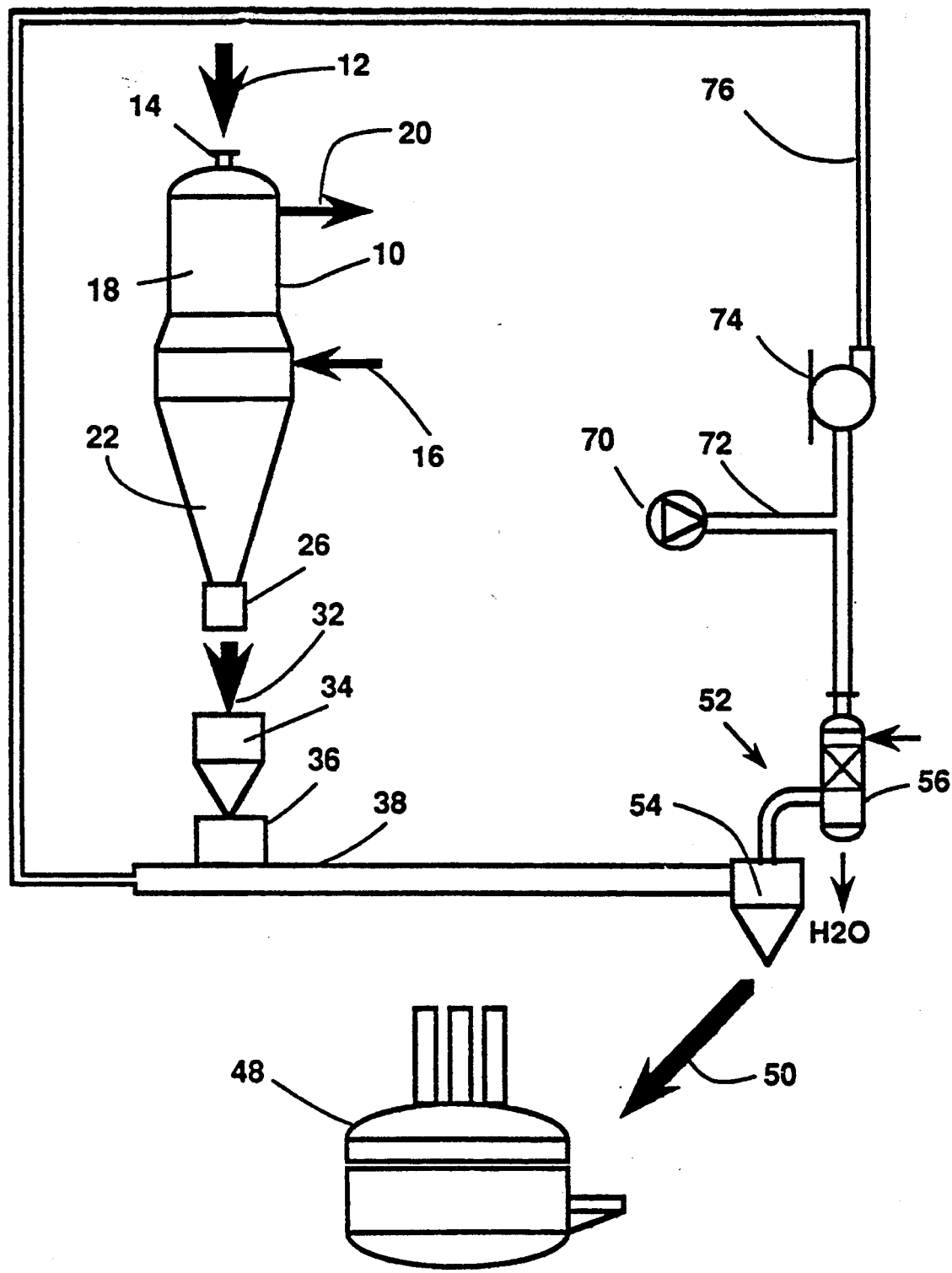
FIG. 2 shows a more particularly preferred embodiment of the invention for the pneumatic transport of DRI wherein the carrier gas utilized advantageously is air which is continuously recycled in an endless loop back through the transport duct.

In FIG. 2, those elements which are the same have been designated with the same numerals as in FIG. 1. FIG. 2 shows a particularly preferred embodiment where air is used as the carrier gas which is recycled to great advantage. The oxygen of the initial charge of air as the carrier gas in the transport and recycle ducts (38 & 76) reacts with DRI and, when recycled, the resulting carrier gas composition very soon stabilizes to almost pure nitrogen. This characteristic makes the operation of the pneumatic transport very economical. A stream of air is supplied as an initial charge (and thereafter only as a make-up in small amounts) from a suitable source 70 through duct 72 and is caused to circulate in a closed circuit by compressor 74 through return duct 76 and transport duct 38 in order to convey DRI introduced to duct 38 by means of a feeder or dosifier device 36.

DRI 50, transported from the accumulation/discharge bin 34 to the receiving/separation station 52, is then utilized in the electric arc furnace 48 to be melted and refined in said furnace 48 to produce the desired steel.

Thus, even though the utilization of air would seem to be counterindicated due to DRI reactivity with air, especially at the high temperatures existing with the preferred transport of hot DRI; nevertheless, by recycling the carrier air its relatively small finite oxygen content is soon consumed, resulting in a carrier gas which is almost pure nitrogen. Recycling can be accomplished at relatively high temperatures, even with the scrubbing and partial cooling in tower 56 (needed to protect the compressor 74), thus minimizing yet another source of heat loss. Furthermore, the heat content of the separated still-hot recycle carrier gas is relatively small, because among other things at high temperatures a given mass of gas has a larger volume so less gas is needed to transport a given mass of DRI. Furthermore, the work of the compressor tends to reheat the recycle gas too.

Figure 3:
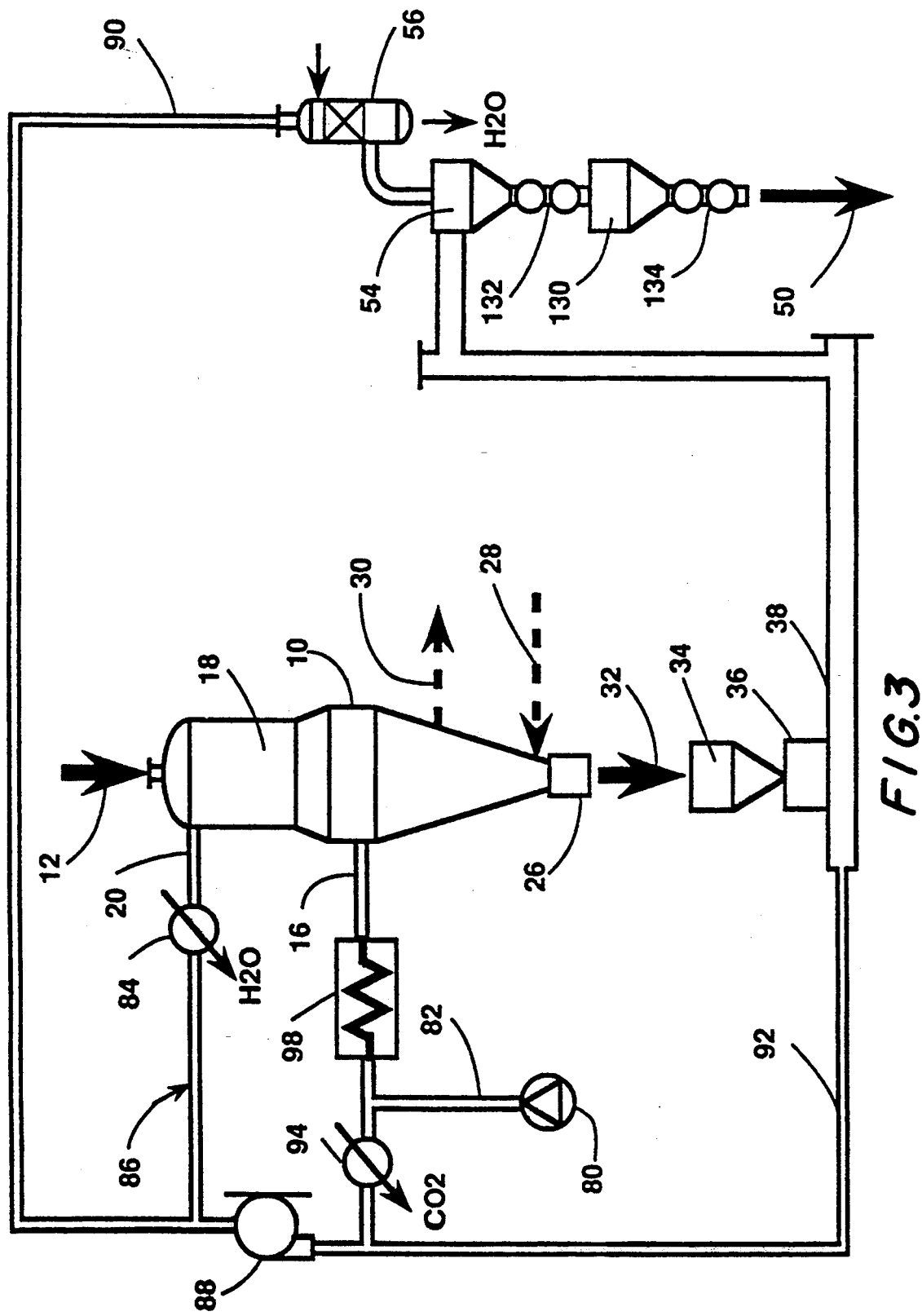
FIG. 3 shows a modified preferred embodiment of the invention wherein the carrier gas is the same as the reducing gas used for producing the DRI.

In the alternative embodiment of FIG. 3, a reducing gas from a source 80, for example produced by the catalytic reformation of natural gas with steam, is introduced through duct 82 into the reduction circuit 86 comprising the reduction zone 18 of reactor 10, a gas cooler 84, a compressor 88, a $CO_2$ absorber 94 and a gas heater 98. A portion of the reducing gas leaving compressor 88 (preheated if necessary for hot transport, e.g. to 700° C.) is led through duct 92 to duct 38 to be utilized as the carrier gas for DRI introduced from the feeder 36. Available tail gas from the reducing loop 86 may also be used as a carrier gas source. The reducing gas, after having been separated from DRI at bin 54, is cooled and cleaned in gas cooler 56 and is recycled to compressor 88 via duct 90.

DRI is introduced from bin 34 to duct 38 through a regulating device 36, and, after gas separation in bin 54, passes to lockhopper 130 which is provided with sealing valves 132 and 134 to discharge the DRI from the transport system without contact of the reducing gas with the atmosphere. See U.S. Pat. Nos. 3,710,808 and 4,498,498 for such valve systems.

Figure 4:
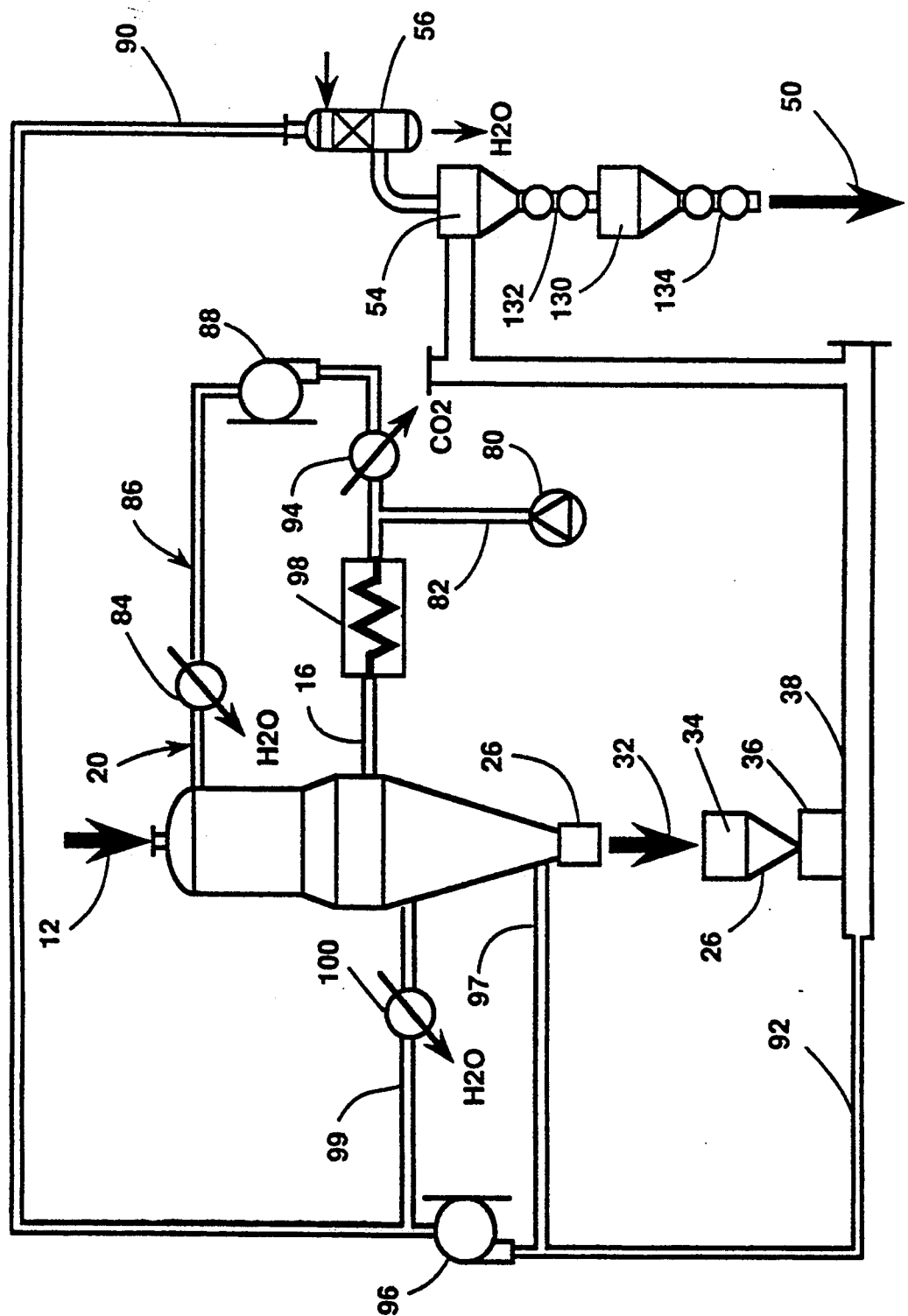
FIG. 4 shows another modified embodiment of the invention wherein the carrier gas is the same gas as that used for DRI cooling.

FIG. 4 shows another embodiment of the invention wherein the carrier gas is a portion of the cooling gas utilized in the lower part of the reduction reactor, which normally is also a reducing gas or natural gas. More particularly, a portion of the cooling gas circulating through a circuit comprising the cooling zone of the reactor, a gas cooler 100, a duct 99, and a compressor 96, is introduced into duct 38 by means of duct 92 to be utilized as carrier gas for the DRI. Operation of the other components of the system is the same as described with reference to the previous figures.

Figure 5:
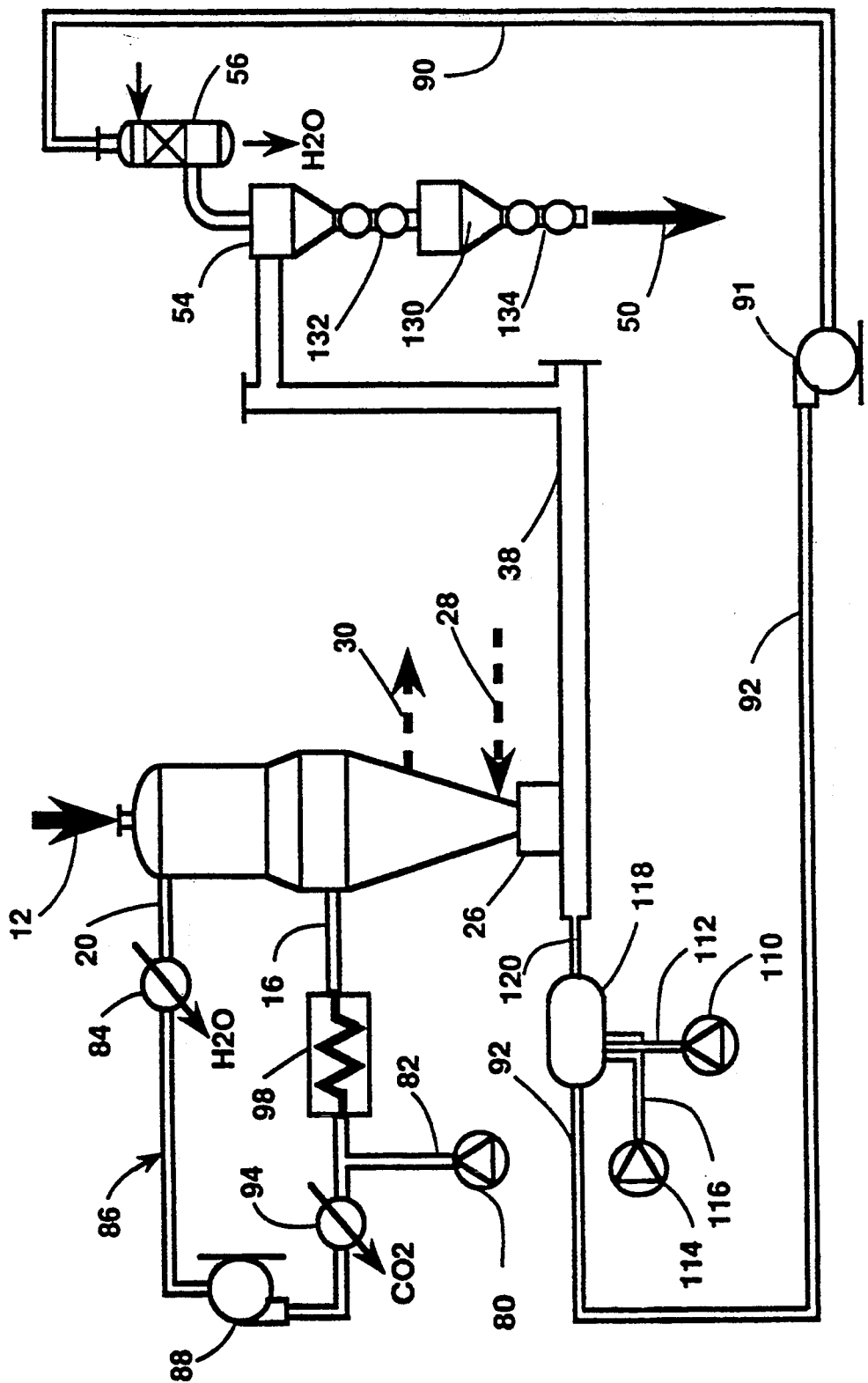
FIG. 5 shows an embodiment of the invention similar to FIG. 2, wherein DRI is introduced to the pneumatic transport duct directly from the device which regulates the rate of ore processing in the reduction reactor, and the carrier gas is combusted natural gas.

FIG. 5 shows another embodiment on the invention wherein the carrier gas is generated through the combustion of natural gas, or of any other suitable fuel, with air. A stream of natural gas from a suitable source 110 is introduced through duct 112 into gas generator 118 where it undergoes combustion with air from a source 114 which is introduced into generator 118 through duct 116.

Combustion in generator 118 consumes the oxygen in the air, forming a carrier gas largely composed of nitrogen and carbon dioxide. This carrier gas is injected via duct 120 into the transport duct 38. Optionally, the carrier gas discharged from scrubber 56 is recycled to the gas generator 118 or directly to the injector duct 120, thus decreasing the consumption of air and make-up fuel.

Figure 6:
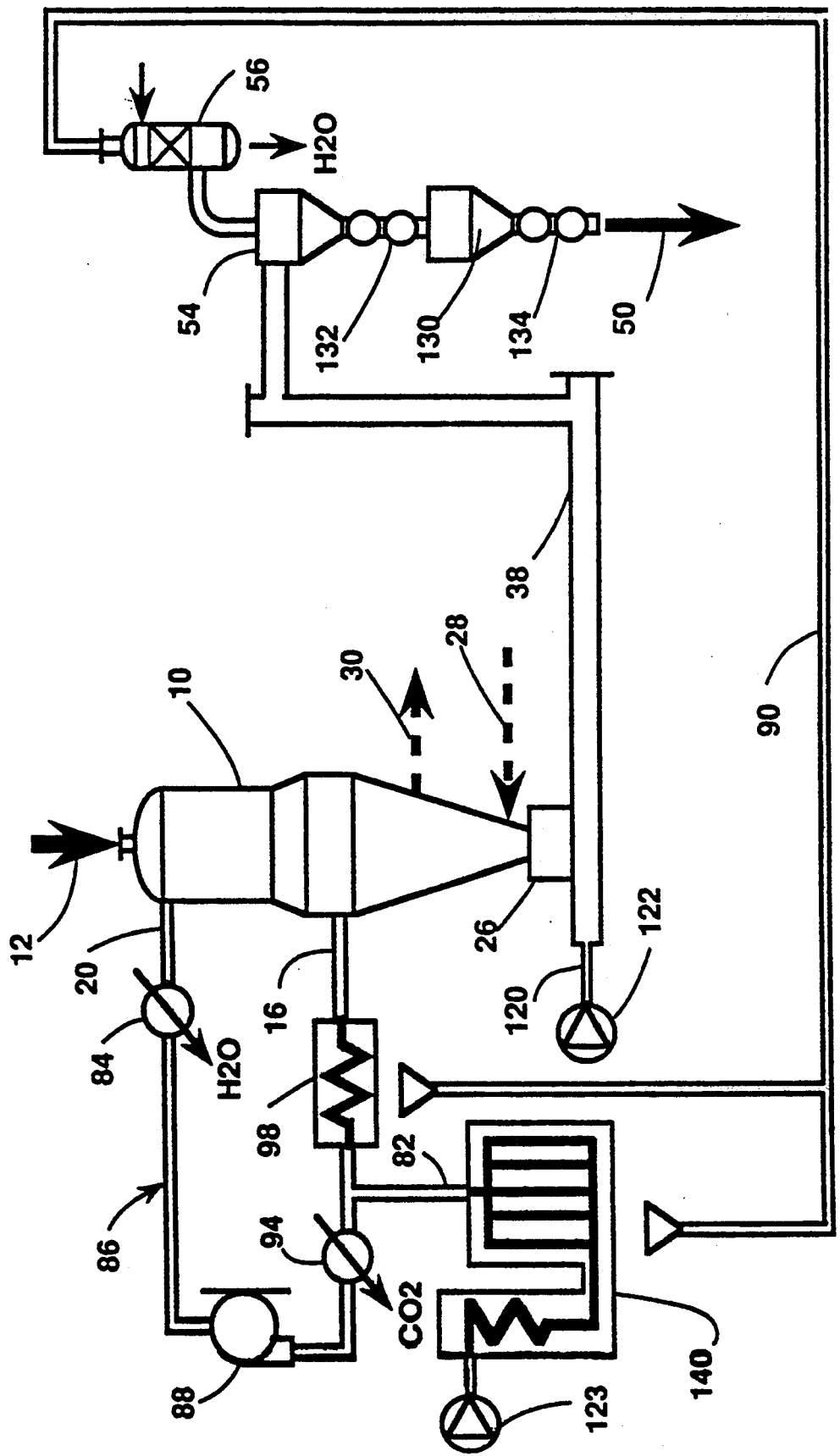
FIG. 6 shows still another modified preferred embodiment of the invention wherein the carrier gas in the DRI pneumatic transport is natural gas, which, after it is used in said DRI transportation, is shown fed to burners for a heater and a steam reformer (being normally still too dirty for use as a feed to the catalytic reformer)

FIG. 6 shows another embodiment of the invention wherein the carrier gas utilized for pneumatic transport is natural gas which is fed, from a suitable source 122 available at a high pressure, to duct 38 through supply duct 120. A regulating and dosifying device 26, which removes DRI at a controlled rate from the reduction reactor, feeds DRI directly to duct 38 to be transported therein (thus omitting the intermediate accumulation bin 34 and discharge device 36). This omission (or inclusion) of bin 34 and discharge device 36 can be made in the embodiments in the other Figures also. Dosifying device 26 may be a rotary valve or star feeder, or a device of the type of a screw or vibratory, as it has been described here with reference to the previous figures.

Natural gas, once separated from DRI at bin 54, is cleaned in tower 56 and is fed to the burners for the heater 98 and the reformer 140 through return pipe 90. In reformer 140, natural gas is caused to react with steam which are fed to said reformer from a source 123 in a manner known in the art. The reducing gas produced in the reformer 140 is injected into the reducing gas loop 86 through pipe 82 in order to produce the DRI in reactor 10. In accordance with U.S. Pat. No. 4,528,030, issued Jul. 9, 1985, the external reformer with its sensitive catalyst tubes can be omitted and the natural gas and steam from source 123 (or possibly even 90) can feed directly into the reduction circuit 86.

Referring next to FIGS. 7 to 10, these are illustrated in scale relative to each other in order to emphasize the capital cost saving of the small support structure shown in FIGS. 9 and 10 according to the present invention relative to the large prior art structures shown in FIGS.

7 and 8. The structure in FIG. 7 is 96 meters tall, that in FIG. 8 is 66 meters tall, and that in FIG. 9 is only 47 meters tall (when the the alternative conventional iron-ore feed shown in phantom outline is omitted) even though the reactor heights in all three direct reduction plants are for all practical purposes the same.

FIG. 9 as illustrated shows the compactness resulting from use of dual pneumatic feeds to and from the reactor 10. Also shown in phantom outline on top of the support superstructure 142 is an "optional" upper portion 142" for supporting a conventional iron ore feed device to the reactor 10, which can include a conveyor belt or skip hoist 144 feeding successively into an open receiving bin 146 and a pressurizing bin 148 having pressure valve combinations 150 and 152 (similar to the sealing valves 132 and 134 of lockhopper 130, see FIG. 3). The pressure bin 148 feeds through the valving 152 into the distributor 154 via feed pipe 158 and from there via reactor inlet pipes 14 into the reduction zone 18 of the reactor 10.

This conventional iron ore feed system, shown in phantom outline in FIG. 9, will be seen to be identical to that actually used in the prior art structures in FIGS. 7 and 8. All of this conventional feed device and its related support structure 142" can be eliminated if a pneumatic feed 156 according to the present invention is used as illustrated for charging the reactor 10 (via pneumatic feed pipe 38'). As can be seen at the left of FIG. 9, the pneumatic feed 156 has an open feed hopper 147 and a pressure bin 149 with associated valving 151 and a screw feed 153.

The pneumatic feed system 156 supplies iron ore particles 32 to the distributor 154 via pneumatic feed transport pipe 38' fed by screwfeed 153 to junction 36' and impelled by carrier gas 40 supplied by pipe 41'. The discharge pneumatic conveyor pipe 38 similarly has a carrier gas stream source pipe 41. In case of emergency or shutdown of the pneumatic transport system through pipes 38 or 38', the bypass discharge pipes 160 or 160' can be utilized.

Since FIG. 8 illustrates a conventional DRI reduction reactor having a cold discharge, the cooling gas inlet 28 and outlet 30 are illustrated and the depressurizing bins 35 are needed in order to discharge sponge iron (DRI) onto a conventional conveyor belt 162. This conveyor belt can be of the type illustrated in U.S. Pat. No. 4,254,876 (which as can be seen is open to the atmosphere). The necessity for the depressurization bins 35 increase the height of the reactor 10 with its associated equipment in contrast to structure constructed according to the present invention.

This vertical height requirement is accentuated in the structure shown in FIG. 7 which has a hot discharge to briquetting machines 44 requiring both bins 35 and accumulating bin 37 followed by distributor legs 164 feeding the individual briquetting machines 44. The briquetting machines 44 must be elevated in order to properly handle the chain of briquet formed.

The rotary valve 26 of the reactor 10 in FIG. 7 feeds a distributor 166 that in turns feeds the bins 35.

If the present invention as illustrated in FIG. 9 is applied to the structure shown in FIG. 7, the 96 meter super structure can be reduced to approximately 38 meters. This is accomplished by placing the reactor 10 beside the briquetting mechanism and having a pneumatic transport 38 feed into the top distributor 166 via a shortened pipe 158 (and by lowering the reactor 10 so that the pneumatic transport pipe 38 is at the same level as the ore transport pipe 38'). With this modification the briquetting mechanism and the reactor are essentially the same height and the pneumatic feeds to and from the reactor eliminate the conventional feed and discharge mechanisms thereby reducing the overall height by almost two thirds.

It will be understood by those skilled in the art that the heater 98 must be kept close to the inlet pipe 16 of the reactor 10 in order to keep the energy efficiency up by minimizing heat losses. This means that in the conventional structures shown in FIGS. 7 and 8 not only must the reactor 10 be positioned at a greater height, but the substantially larger and heavier heater must also be raised in equal amount. As these heights increase, the mass and therefore cost of the super structure greatly increases.

EXAMPLE 1

Thirty six (36) tons of DRI at high temperature were pneumatically transported in a pilot plant from a discharge bin through successive runs of 4" diameter pipe joined by T-junctions, which runs were 2 meters horizontally, 6 m vertically, 71 m horizontally, and 1 m vertically, followed by a horizontal right angle turn and then further runs of 13 m horizontally, 13 m vertically, and then finally into a 11 m vertical pipe of 6" diameter.

| Operating conditions were: | |
| --- | --- |
| Gas: | air |
| Pressure at inlet: | 1.8 kg/cm$^2$ man. |
| Flow rate: | 80 lbmol/hr |
| Temperature: | 30 degrees Centigrade |
| Gas Velocity at inlet: | 20 meters/second |
| Solid Material: | DRI pellets |
| Temperature: | 650 degrees C. |
| Rate of transport: | 20 tons/hr. |

| | SCREEN ANALYSIS | |
| --- | --- | --- |
| Size (inches) | Initial Weight Fraction (%) | Final Weight Fraction (%) |
| 1/2 | 30 | 14 |
| 3/8 | 32 | 27 |
| 1/4 | 18 | 27 |
| 1/8 | 13 | 23 |
| <1/8 | 7 | 9 |

The following data were taken at the outlet point:

| | |
| --- | --- |
| Temperature: | 550 Degrees Centigrade |
| Pressure Drop: | 1.8 Kg/cm$^2$ |
| Pressure: | Atmospheric |
| Power: | 5 Kilowatts/ton |
| Solids/Gas ratio (mass): | 19 |

EXAMPLE 2

The experiment of Example 1 was repeated, but with the 36 tons of DRI being instead at ambient temperature.

| Operating conditions were: | |
| --- | --- |
| Gas: | air |
| Pressure at inlet: | 1.97 kg/cm$^2$ man. |
| Flow rate: | 165 lbmol/hr |

-continued

Operating conditions were:

| | |
|---|---|
| Temperature: | 30 degrees Centigrade |
| Gas Velocity at inlet: | 20 m/s |
| Solid Material: | DRI pellets |
| Temperature: | 35 degrees Centigrade |
| Rate of transport: | 20 tons/hr. |

SCREEN ANALYSIS

| Size (inches) | Initial Weight Fraction (%) | Final Weight Fraction (%) |
|---|---|---|
| 1/2 | 61 | 25 |
| 3/8 | 28 | 51 |
| 1/4 | 8 | 16 |
| 1/8 | 3 | 7 |
| <1/8 | 0 | 1 |

The following data were taken at the outlet point:

| | |
|---|---|
| Temperature: | 550 degrees Centigrade |
| Pressure Drop: | 1.8 Kg/cm$^2$ |
| Pressure: | Atmospheric |
| Power: | 10 Kw/ton |
| Solids/Gas ratio (mass): | 15 |

If "fines" are defined as being anything less than $\frac{3}{8}$", then the pneumatic transport of friable DRI increased the fines content surprisingly by about only 1 or 2%.

Note that because of the greater weight of the air under ambient temperature conditions in Examine 2 as compared to Example 1, twice as much power was needed to transport cold DRI than was needed for the same amount of hot DRI.

The experimental apparatus can empty about 36 tons of DRI in about 45 minutes and has transported DRI over 200 meters, including a vertical rise of about 20 meters.

The types of carrier gas herein described, may be employed in the embodiments discharging cold DRI as well as in embodiments discharging hot DRI. DRI may be introduced into the transport duct 38 with or without an intermediate discharge bin 34.

As a practical matter, economically and otherwise, the upper limits of the particle size to be transported should be about three inches (and preferably no more than $\frac{1}{3}$ the diameter of the transport pipe). Normally the DRI pellets mainly are from greater than $\frac{1}{8}$" to $\frac{3}{4}$", and DRI lumps range up to 1" to 1$\frac{1}{2}$". The practical length of pneumatic transport is under 2000 m, most typically about 200 to 300 meters. Thus typical pneumatic transport in an experimental plant from the reduction reactor to the EAF is less than a minute through a 4" to 6" progressively increasingly sized pipe. This gives minimal time for heat loss during transport. Preferably the pipe 38 is insulated to further conserve energy. The energy used in pneumatic transport of DRI (mainly electric costs for the compressor) are more than made up for in the savings in time, energy, and retained fines.

Relatively lower gas velocities are preferred so as to minimize abrasion and congestion, but with sufficient velocity for efficiency of transport. For example, for a 4" pipe 164 meters long, the transport of typical DRI from a moving bed reactor generated a bell curve when the capacity of DRI conveyed was plotted against gas velocity (from about 11 metric tons of DRI/hour at a velocity of 9 meters/second, to about 23 m tons/hr. at 20 m/s, and back down to 11 m tons/hr. at 35 m/s); thus indicating a preferred range of about 17 to 25 m/s velocity of the carrier gas.

In further work on the pilot plant, the following advantages of the present invention, particularly as applicable to hot transport from a direct reduction reactor to an electric arc furnace, have been noted and quantified. The capital savings from reduced superstructure have already been discussed. Since the hot DRI handling is carried out in an enclosed pneumatic system, the environmental impact by eliminating open conveyor belts is significantly reduced and the total metallic yield is thereby improved due to less fines losses. In the electric furnace, since advantage is taken of the high temperature of the hot discharged DRI, experiments have determined that there is a significant reduction of about 19% in the electric energy consumption required per ton of liquid steel. Furthermore, productivity, measured as tap to tap time is significantly improved by 16%. There are additional savings in operating costs related to decreased consumption of electrodes and refractories. Even with increased operating cost for the pneumatic transport system relative to conventional conveyor belt systems, these experiments confirm that there will be commercially an overall significant energy saving from a decrease in the consumption of natural gas and electricity, savings in capital costs, in other direct costs (e.g. in EAF electrodes and refractories), and an increase in melt-shop productivity, and not insignificantly the benefit of operating a significantly more environmentally friendly process and apparatus.

What is claimed:

1. Apparatus for reducing iron ore particles to sponge iron particles by means of a reducing gas, comprising:
    a vertical shaft moving bed reduction reactor with a reduction zone and a discharge zone;
    a support structure therefore;
    charging means for effecting introduction of iron ore into said reduction zone;
    discharging means for effecting removal of reduced iron ore in the form of sponge iron particles from said discharge zone;
    at least one of said charging means and said discharging means being a particulate solids pneumatic pipe conveyor with a particle handling bin laterally remote from and nonaligned vertically with respect to said reactor and said support structure; and
    said charging means and said discharging means both being separate pneumatic conveyors and including respective pressure lock bins arranged to alternately communicate with said reactor and an atmosphere at a different pressure by means of gas sealing valves, and both bins being non-aligned vertically with the reactor with a substantially horizontal overlap whereby the height of the reactor support structure is on the order of the height of the reactor.

2. Apparatus for reducing iron ore particles to sponge iron particles by means of a reducing gas, comprising:
    a vertical shaft moving bed reduction reactor with a reduction zone and a discharge zone;
    a support structure therefore;
    charging means for effecting introduction of iron ore into said reduction zone;

discharging means for effecting removal of reduced iron ore in the form of sponge iron particles from said discharge zone;

at least one of said charging means and said discharging means being a particulate solids pneumatic pipe conveyor with a particle handling bin laterally remote from and nonaligned vertically with respect to said reactor and said support structure;

a charge inlet to said reduction zone;

a discharge outlet from said discharge zone;

a dosifier for controlling discharge of sponge iron particles from said zone through said outlet;

means for feeding a hot reducing gas at the bottom of said upper reduction zone;

means for removing the spent first stream of hot reducing gas at the top portion of the reduction reactor; and said discharging means including:

(a) a pneumatic conveying pipe being in open communication through said discharge outlet to the interior of said reactor, said pipe extending from said discharge outlet to a remote point of use;

(b) said particle handling bin being at least one disengaging bin connecting with said conveying pipe at said remote point for separating pneumatically transported sponge iron particles from carrier gas; and (c) a gas supply feeding into said conveying pipe adjacent said discharge-outlet being positioned and constructed to supply carrier gas in a quantity, pressure, and velocity capable of pneumatically transporting sponge iron particles of a size at least 80% of which are greater than 0.5 cm and at least 50% of which are greater than 1.0 cm from said discharge outlet to said disengaging bin.

3. Apparatus according to claim 2, further comprising:

a return duct connecting with said disengaging bin to receive and recycle disengaged carrier gas back in a closed pneumatic loop to said gas supply;

a cleaning and cooling unit in said return duct for cleaning and cooling the disengaged cooling gas;

a compressor positioned after the cleaning and cooling unit so as to receive and move along cleaned and cooled recycled carrier gas; and a heater for effecting the heating of carrier gas furnished to said gas supply including at least gas recycled by said duct.

4. Apparatus according to claim 3, further comprising a sourcing device for suppling carrier gas make-up.

5. Apparatus according to claim 4, wherein said feeding means and said removing means are connected externally in a separate reducing gas conduit loop, which reducing loop includes a scrubber/cooler, a separate compressor, a carbon dioxide removal unit, and a separate heater, said sourcing device connecting said reducing loop from between the separate compressor and the carbon dioxide removal unit to said pneumatic loop upstream of the carrier gas compressor, whereby the gas in the reducing loop serves as make-up for the carrier gas.

6. Apparatus according to claim 4, wherein said feeding means and said removing means are connected externally in a reducing gas conduit loop, which reducing loop includes a scrubber/cooler, a compressor, a carbon dioxide removal unit, a heater, and the reduction zone, said pneumatic loop and said reducing loop being interconnected so as to share the compressor in common, whereby a portion of the reducing gas from the reducing loop serves as the make-up for the carrier gas.

7. Apparatus according to claim 3, wherein said feeding means and said removing means are connected in an external reducing gas conduit loop, which loop includes a scrubber/cooler, a compressor, a carbon dioxide removal unit, and a heater, said pneumatic conveying pipe and said recycle duct forming a separate loop for carrier gas and each loop have an independent heater and compressor.

8. Apparatus for reducing iron ore in the form of iron-containing particles by means of a reducing gas, comprising:

a vertical shaft moving bed reduction reactor with a reduction zone and a discharge zone;

a support structure therefore;

an iron ore particle charger directed into said reduction zone;

a reduced iron-containing particle discharger constructed to draw from said discharge zone iron-containing particles in the form of iron ore which has been at least partially reduced; and at least one of said charger and said discharger comprising (a) a particulate solids pneumatic pipe conveyor having a feed end and a delivery end, (b) at least one particle handling bin laterally remote from and nonaligned vertically with respect to said reactor permitting the height of said support structure to be reduced by at least the height of said bin, said pipe conveyor extending between said bin and said reactor, and (c) a gas supply directed into said conveying pipe at said feed end being positioned and constructed to supply carrier gas in a quantity, pressure, and velocity capable of pneumatically transporting iron-containing particles of a size at least 80% of which are greater than 0.5 cm and at least 50% of which are greater than 1.0 cm from said feed end to said delivery end.

9. Apparatus according to claim 8, wherein said reactor is a higher pressure vessel; said discharger includes said pipe conveyor, at least two of said bins, and said gas supply; said bins are pressure lock bins arranged to communicate alternately with said reactor and an atmosphere at a different pressure by means of gas sealing valves, and said bins are nonaligned vertically and have a substantial horizontal overlap with respect to said reactor and its support structure; such that the height of the reactor support structure is decreased as compared with the height required for a reduction reactor having said bins vertically aligned with said reactor and requiring non-overlapping support therewith.

* * * * *